United States Patent Office 3,531,458
Patented Sept. 29, 1970

3,531,458
5-ARYLAZO-PYRIMIDINE MONOAZO DYESTUFFS
Hans Ackermann, Werner Bossard, Jacques Voltz, and Hans Wegmuller, Riehen, Switzerland, assignors to J. R. Geigy A.G., Basel, Switzerland
No Drawing. Filed Nov. 8, 1967, Ser. No. 681,553
Claims priority, application Switzerland, Apr. 27, 1967, 6,054/67
Int. Cl. C09b *19/36*; D06p *1/02*
U.S. Cl. 260—154        8 Claims

ABSTRACT OF THE DISCLOSURE

Dispensible dyestuffs which are 5-arylazo-pyrimidines wherein one of the carbon atoms in 2-, 4- and 6-position of the pyrimidine ring is occupied by a substituted hydroxyl or mercapto group and the other two carbon atoms by amino groups, at least one of the substituents of the nitrogen atoms of the last-mentioned amino groups being an unsubstituted or non-ionogenically substituted phenyl radical; such dyestuffs being distinguished by good affinity especially for polyester fibres and affording dyeings on these fibres which have excellent fastness properties; processes for dyeing polyester fibers with these dyestuffs; and compositions containing polyester fibres and such dyestuffs.

DESCRIPTION OF THE INVENTION

The present invention concerns new, difficultly water soluble azo dyestuffs which can be used as dispersion dyestuffs, processes for their production, processes for the dyeing of hydrophobic organic fibre material, particularly textile fibres made from linear high molecular esters of aromatic polycarboxylic acids with polyvalent alcohols or from cellulose esters and, as industrial product, the fibre material dyed with the new dyestuffs.

That a dispersion dyestuff should have excellent drawing power is a prerequisite for the production of dyeings which are to be utilised commercially. Dyestuffs having insufficient drawing power tend to agglomerate, particularly when dyeing aromatic polyester fibres in closed circulation apparatus. Agglomerated dyestuff particles are filtered off onto the material to be dyed when the liquors are circulated and, therefore, do not take part in the dyeing process. This is called "filtration effects." They cause uneven, weakly coloured dyeings which are not fast to rubbing and solvents.

It has been found that new, difficultly water-soluble azo dyestuffs which are satisfactory in this respect and which meet other requirements, are those provided by the instant invention which correspond to the formula

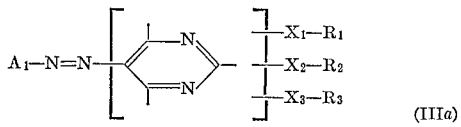

(IIIa)

wherein $A_1$ represents a phenyl radical substituted as follows:

(a) By, as first substituent, a nitro group;

(b) By a second substituent selected from hydrogen, nitro, cyano, fluorine, chlorine, bromine, lower alkyl, lower alkoxy, phenoxy, trifluormethyl, lower alkylsulfonyl, phenoxysulfonyl, lower alkylphenoxysulfonyl, lower alkoxycarbonyl, hydroxy-lower alkoxycarbonyl, lower alkoxy-lower alkoxy carbonyl and a substituent of the formula

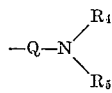

wherein Q represents —$SO_2$— or —CO—, $R_4$ represents hydrogen, lower alkyl, hydroxy-lower alkyl, lower alkoxy-lower alkyl, phenyl, benzyl or cyclohexyl, and $R_5$ represents hydrogen, lower alkyl or hydroxy-lower alkyl; and (c) By a third substituent selected from hydrogen, chlorine or bromine; one of the groupings —$X_1$—$R_1$ and —$X_2$—$R_2$ is a phenylamino radical any substituent of which is selected from hydrogen, lower alkyl, lower alkoxy, chlorine, bromine and cyano, one of the substituent pair consisting of the remaining substituent —X—R and the substituent —$X_3$—$R_3$ represents lower alkoxy; cyclohexyloxy; benzyloxy; a phenyloxy radical any substituent of which is selected from hydrogen, lower alkyl, lower alkoxy, chlorine and bromine; lower alkanoyloxy-lower alkoxy, hydroxy-lower alkoxy, lower alkoxy-lower alkoxy, phenoxy-lower alkoxy, benzyloxy-lower alkoxy, benzoyloxy-lower alkoxy, lower alkoxy-carbonyloxy-lower alkoxy, lower alkylthio, cyclohexylthio, benzylthio, hydroxylower alkylthio, phenylthio, lower alkyl-phenylthio, lower alkoxy-lower alkylthio, phenoxy-lower alkylthio or cyclohexyloxy-lower alkoxy; and the third substituent —X—R represents amino, lower alkylamino, cyclohexylamino, benzylamino, lower alkanoyloxy-lower alkylamino, hydroxy-lower alkylamino, lower alkoxy-lower alkylamino, phenoxy-lower alkylamino, benzyloxy-lower alkylamino, benzoyloxy-lower alkylamino or lower alkoxycarbonyloxy-lower alkylamino.

Preferably the nitro group which is present as first substituent at the phenyl radical represented by $A_1$ is in o- or p-position relative to the azo bridge at the latter radical.

The dyestuffs according to the invention are suitable, chiefly, for the dyeing of hydrophobic organic fibre material from an aqueous dispersion, particularly for the dyeing of textile fibres made from linear high molecular esters of aromatic polycarboxylic acids with polyfunctional alcohols, e.g. from polyglycol terephthalates, polyglycol isophthalates or polycyclohexane diol terephthalates, or from cellulose esters, e.g. cellulose-2½-acetate and cellulose triacetate fibres. On these fibres they produce strongly coloured greenish yellow, yellow, orange, scarlet, red and brown dyeings which have excellent fastness to washing, milling sublimation, light, rubbing, perspiration, solvents, crossdyeing, decatising, gas fading and industrial fumes.

Dyestuffs according to the invention can also be used, however, for the dyeing of synthetic polyamide fibres such as polyhexamethylene adipic acid amide, polycaprolactam or polyamino undecanoic acid, as well as for the dyeing of polyolefins, particularly polypropylene fibres.

Polyglycol terephthalate fibers are dyed with the aqueous dispersions of dyestuffs according to the invention, preferably at temperatures of over 100° C., under pressure. The dyeing can also be performed, however, at the boiling point of the dye liquor in the presence of carriers such as alkali metal phenylphenolates, polychlorobenzene compounds or similar auxiliaries, or by the pad dyeing process in the padding mangle with subsequent heat treatment, e.g. thermofixing at 180–220° C. Cellulose-2½-acetate fibres are preferably dyed at temperatures of 80–85° C., whilst cellulose triacetate fibres and also synthetic polyamide fibre material is advantageously dyed at the boiling point of the dyebath. In the dyeing of the latter type of fibres, the use of carriers is not necessary in many cases. Azo dyestuffs according to the invention can also be used for the printing of the materials mentioned by the usual methods.

In addition, animal and vegetable fibres, particularly cotton or wool, are very well reserved by the dyestuffs according to the invention. Good and level, penetrated dyeings, even on closely woven fabric or tightly twisted yarns, are obtained with the dyestuffs according to the invention.

Dyestuffs according to the invention, particularly when they consist of mixtures of isomers, differ from previously known dyestuffs of similar constitution in their very good drawing power and excellent buildup onto polyglycol terephthalate fibres. Also, dyeings obtained with the dyestuffs according to the invention have, in most cases, substantially better fastness to light and sublimation.

Particularly valuable dyestuffs according to the invention which are distinguished both by good fastness to sublimation and excellent fastness to light as well as by very good drawing power and very good buildup, are derived from mixtures of isomers of the Formulae VIa and VIb or VIIa and VIIb,

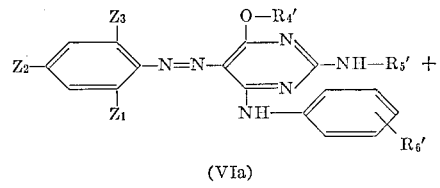

(VIa)

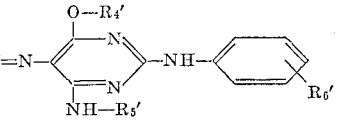

(VIb)

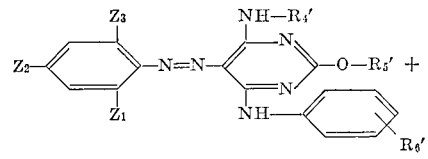

(VIIa)

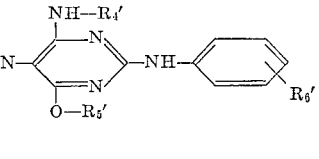

(VIIb)

wherein of $Z_1$, $Z_2$ and $Z_3$, one Z is the nitro group, a second Z is hydrogen, the nitro, cyano, methylsulphonyl or ethylsulphonyl group, chlorine or bromine, and the third Z is hydrogen, chlorine or bromine, of $R_4'$ and $R_5'$, one R' is a lower alkyl group substituted by a hydroxyl group, lower alkoxy group or lower alkanoyloxy group, and the other R' is a lower alkyl group optionally substituted by a lower alkanoyloxy, hydroxy or lower alkoxy group, and $R_6'$ is hydrogen, the methyl or methoxy group.

Dyestuffs according to the invention are also suitable for the dyeing of cellulose esters, polyglycol terephthalates and polyamides in the mass. Because of their good solubility in organic solvents such as acetone or chloroform, they can also be used in lacquers and printing inks.

The dyestuffs falling under Formula IIIa and dyestuffs of similar structure, but which are often less readily accessible and usually of inferior light fastness are produced by coupling a diazonium compound of an amine of Formula I $$A\text{—}NH_2 \qquad (I)$$

with a coupling component of Formula II

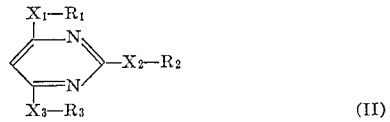

(II)

to form an azo dyestuff of Formula III

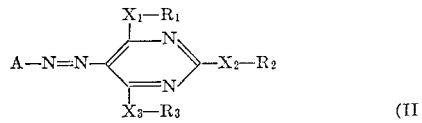

(III)

the starting materials being so chosen that the azo dyestuff obtained contains no ionogenic groups forming salts in water, i.e. it contains neither groups which dissociate acid in water such as sulphonic acid, carboxylic acid or phosphonic acid groups, nor onium groups such as ammonium or sulphonium groups.

In the Formulae I, II and III:

A represents an optionally substituted aryl radical, of $X_1$, $X_2$ and $X_3$, one X represents an oxygen or sulphur bridge and the other X's represent an —NH— bridge, and of $R_1$, $R_2$ and $R_3$, a first R represents an optionally substituted phenyl radical bound by way of an —NH— bridge to the pyrimidine nucleus, and the other R's each represent an unsubstituted or substituted hydrocarbon radical, or, in the case of the second one linked via —NH—, also hydrogen.

The radical A is advantageously a mono- or polynuclear, condensed or non-condensed aromatic carbocycle, particularly an unsubstituted or non-ionogenically substituted phenyl or naphthyl radical.

Preferably A represents a phenyl radical non-ionogenically substituted by electron attracting substituents. Examples of electron attracting, non-ionogenic substituents are: halogens such as fluorine, chlorine or bromine; the cyano, thiocyano, nitro, trifluoromethyl group; also acyl groups, i.e. carbacyl groups such as lower alkanoyl or alkenoyl groups, also the aroyl groups such as the benzoyl group, or organosulphonyl groups such as lower alkylsulfonyl or arylsulfonyl groups, further sulphonic acid aryl ester groups such as the sulfonic acid-phenyl-, -alkylphenyl- or -halogenophenyl-ester groups; carboxylic acid ester groups, e.g. the carbophenoxy group, particularly however, carbalkoxy groups such as the carbomethoxy, carboethoxy, carboisopropoxy or carbobutoxy group; the sulfonic acid amide or carboxylic acid amide group; N-mono- or N,N-disubstituted carbamoyl or sulphamoyl groups having a phenyl group and/or alkyl, hydroxyalkyl, acyloxyalkyl, particularly low alkanoyloxyalkyl, alkoxyalkyl, cyanoalkyl or cycloalkyl or phenylalkyl substituents. Such groups can also be further substituted non-ionogenicaly. In addition to the preferred, electron attracting substituents, the radical A can also contain non-ionogenic, electron repelling substituents, e.g. low aliphatic, optionally non-ionogenically substituted, e.g. hydroxy substituted, hydrocarbon groups, optionally non-ionogenically substituted low alkoxy groups such as methoxy, ethoxy or ethoxy-carbonylmethoxy groups, optionally non-ionogenically substituted aryloxy groups such as the phenoxy group and the alkyl- or halogen-substituted phenoxy groups, or acylamino groups, particularly carbacyclamino groups, e.g. low alkanoylamino groups such as the acetylamino group, aroylamino groups such as the benzoylamino group, or also low alkylsulphonylamino groups such as the methylsulphonylamino group, or arylsulphonylamino groups such as the phenylsulphonylamino group.

When A represents a naphthyl radical then it can be both an unsubstituted as well as a non-ionogenically substituted 1- or 2-naphthyl radical. The chief substituents are low alkyl and alkoxy groups, halogens such as chlorine or bromine, optionally N-substituted sulphonic acid amide groups, sulphonic acid aryl ester groups, low alkylsulphonyl groups or arylsulphonyl groups.

Preferred diazonium compounds usable according to the invention are derived from amines of Formula I wherein A represents a phenyl radical having a nitro group in o- and/or p-position to the azo group, which phenyl radical is also optionally substituted by further non-ionogenic, preferably electron attracting substituents.

In order to attain the desired sublimation fastness properties and an excellent drawing power and buildup, one R in the azopyrimidine dyestuffs of Formula III according to the invention must be a phenyl radical which is bound to the pyrimidine nucleus by way of an —NH— bridge. The phenyl radical can be both an unsubstituted as well as a non-ionogenically substituted phenyl radical. Examples of non-ionogenic substituents of the phenyl radical are those listed for A above, particularly lower alkyl or lower alkoxy groups.

As hydrocarbon radicals symbolised by $R_1$, $R_2$ and $R_3$ are meant, e.g. normal or branched chain alkyl groups having up to 12, preferably 1 to 5, carbon atoms, cycloalkyl groups such as the cyclohexyl or methylcyclohexyl group, aralkyl groups, particularly phenylalkyl groups such as the benzyl group, and homocyclic aryl groups, e.g. the phenyl group.

If the aliphatic or cycloaliphatic hydrocarbon radicals are substituted, then substituents—particularly for the alkyl radicals—are e.g. the hydroxyl group, alkoxy groups, alkoxy-alkoxy groups or alkoxycarbonyl groups in each of which the alkoxy moiety preferably has 1 to 4 carbon atoms, further, acyloxy groups, particularly low alkanoyloxy groups such as the acetyloxy or propionyloxy group, phenyl groups, phenoxy groups, cyano groups or halogens such as fluorine, chlorine or bromine. If the benzene nuclei of the aromatic or aralphatic hydrocarbon radicals are substituted, then these can also contain the non-ionogenic substituents listed above for A, particularly low alkyl or alkoxy groups.

In azopyrimidine dyestuffs produced according to the invention, the substituents $R_1$, $R_2$ and $R_3$ are preferably bound to the pyrimidine nucleus by way of an oxygen and two —NH— bridges. Particularly valuable azopyrimidine dyestuffs which, among other things, are distinguished by very easy accessibility, good fastness properties and very great affinity to polyglycol terephthalate fibres as well as by good stability in a boiling bath, are derived from pyrimidine coupling components of Formula IV

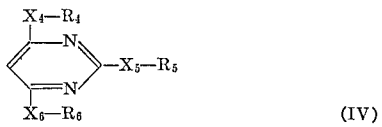

wherein of $X_4$, $X_5$ and $X_6$, one X is the oxygen bond and the other X's represent an —NH— bridge, and of $R_4$, $R_5$ and $R_6$, one R represents an optionally non-ionogenically substituted phenyl radical bound to the pyrimidine nucleus by way of an —NH— bridge, a second R is an alkyl radical substituted by hydroxyl, alkoxy or acyloxy groups, and the third R is an alkyl radical optionally substituted by alkoxy or acyloxy groups.

The pyrimidine compounds of Formula II used as coupling components according to the invention are produced by reacting the three chlorine atoms of the 2,4,6-trichloro-pyrimidine one after the other with primary aliphatic, cycloaliphatic, araliphatic or carbocyclic-aromatic amines or with a metal salt of an aliphatic, cycloaliphatic, araliphatic or carbocyclic-aromatic hydroxyl or mercapto compound. Preferably, less reactive amines are used in the first step and, in the second and third steps, easily reacting, more strongly basic amines and alcoholates, phenolates or mercaptides are used in any order. The products resulting from the first step are generally mixtures of isomers of 2-amino-4,6-dichloro-pyrimidines and 4-amino-2,6-dichloro-pyrimidines which are separated, if desired, by recrystallisation or by chromatographic adsorption, e.g. on aluminium oxides. Preferably however, the mixtures of isomers are used as they yield mixtures of azopyrimidine dyestuffs according to the invention which are distinguished by an extraordinarily good buildup.

The step-wise reaction is performed, e.g. in aqueous, organic or organic-aqueous solution or dispersion, optionally in the presence of acid binding agents such as alkali and alkaline earth metal carbonates or oxides, or tertiary nitrogen bases. Suitable organic solvents are, e.g. alcohols such as methanol or ethanol, ethylene glycol monomethyl ether or monoethyl ether, preferably however, aliphatic ketones such as acetone, methylethyl ketone or methylisobutyl ketone; cyclic ethers, e.g. dioxane or tetrahydrofuran; optionally halogenated or nitrated aromatic hydrocarbons such as toluene, xylenes, chlorbenzene or nitrobenzene.

Low temperatures, advantageously 20–60° C., are used for the reaction of the first chlorine atom of the 2,4,6-trichloro-pyrimidine. The second chlorine atom is reacted at medium temperatures, preferably at 70–100° C., and the third chlorine atom is reacted at higher temperatures, preferably between 80 and 180° C., optionally in a closed reaction vessel.

If, in the pyrimidine coupling components of Formula II or IV usable according to the invention, one or two R's represent(s) an alkyl radical containing one or more hydroxyl groups as non-ionogenic groups, these hydroxyl groups can subsequently be acylated. The anhydrides of low carboxylic acids such as acetic acid anhydride or propionic acid anhydride, the acyl chlorides and bromides of the aliphatic or aromatic series, e.g. acetyl, propionyl or benzoyl chloride or bromide, also chloroformic or bromoformic acid esters, particularly chloroformic or bromoformic acid methyl or ethyl ester are used as acylating agents.

The diazonium compound of an amine of Formula I is coupled with the coupling component of Formula II by the usual methods, preferably in mineral acid to weakly acid aqueous medium, in particular at a pH value of 4–4.5. When the coupling is performed in a mineral acid medium, advantageously the acid is gradually buffered, e.g. with alkali metal salts of low fatty acids. In many cases, the coupling of, in particular, a mixture of the isomeric pyrimidine coupling components usable according to the invention with a suitable diazonium compound has proved to be very advantageous.

A modification of the process according to the invention for the production of difficultly water soluble azo dyestuffs of Formula III wherein $R_1$, $R_2$ and $R_3$, one or two R's represent(s) an alkyl radical substituted by acyloxy groups, consists in reacting a compound of Formula V

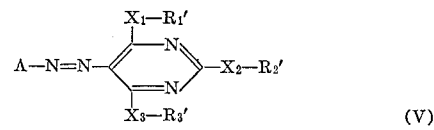

wherein of $R_1'$, $R_2'$ and $R_3'$, one R' represents an alkyl radical substituted by hydroxyl groups, a second R' represents the same, an unsubstituted or a differently substituted hydrocarbon radical and the third R' represents an optionally substituted phenyl radical bound to the pyrimidine nucleus by way of an —NH— bridge, and $X_1$, $X_2$ and $X_3$ have the meanings given above, with an acylating agent, the starting materials being so chosen that the final dyestuff contains no ionogenic groups which form salts in water.

Azo compounds of Formula V are obtained, e.g. by coupling the diazonium compound of an amine of Formula I with the corresponding pyrimidine coupling component, the coupling being performed in the manner described above.

As acylating agents for the acylation of azo compounds of Formula V usable according to the invention, those mentioned above, for example, are suitable.

The acylation is advantageously performed at a raised temperature and in a suitable organic solvent such as glacial acetic acid, chlorobenzene or dioxane, optionally in the presence of an acid binding agent such as sodium acetate, magnesium oxide or pyridine.

The dyestuffs according to the invention are brought into a finely distributed form by milling with surface active dispersing agents. Suitable dispersing agents are, e.g. anionic ones such as alkali metal salts of sec. higher alkylaryl sulphonates, alkali metal salts of condensation products of formaldehyde and naphthalene sulphonic acids, lignin sulphonates, or non-ionogenic ones such as fatty alcohol polyglycol ethers.

The term "lower" (or "low") when used in connection with an aliphatic radical in this specification and the appended claims means a group containing not more than 5 carbon atoms.

The following non-limitative examples illustrate the invention further. Temperatures are given therein in degrees centigrade, and parts and percentages are given by weight unless expressly stated otherwise.

EXAMPLE 1

21.8 g. of 1-amino-2,4-dinitro-6-chlorobenzene are dissolved in 200 g. of concentrated sulfuric acid and, at 20–30°, the solution is diazotised with an amount of nitrosyl sulfuric acid corresponding to 6.9 g. of sodium nitrite. The diazonium salt solution so obtained is added dropwise, at 0–5, to a solution of a mixture consisting of 22.3 g. of 2-ethylamino-4-phenylamino-6-ethoxy-pyrimidine and 3.3 g. of 2-phenylamino-4-ethylamino-6-ethoxy-pyrimidine in 400 g. of 80%-acetic acid and 300 g. of water. On completion of the coupling reaction, a scarlet-coloured precipitate forms, which consists of the mixture of the two isomers of the formulas

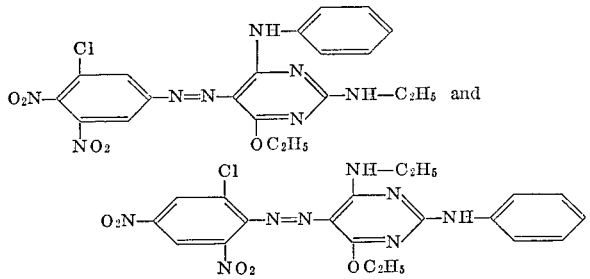

the precipitate is separated by filtration, washed with water and dried. The mixed dyestuff so obtained is brought into a finely distributable form by milling with lignin sulfonate, using 20 g. of the latter per 10 g. of dyestuff.

Polyglycol terephthalate fibres and cellulose triacetate fibres can be dyed with this dye preparation, optionally in the presence of a carrier, such as the sodium salt of o-phenylphenol, in pure yellowish-scarlet shades. The dyeings have very good fastness to washing, perspiration, rubbing, light and sublimation.

The mixture used as coupling component in this example, consisting of 2-ethylamino-4-phenyl-amino-6-ethoxy-pyrimidine and 2-phenylamino-4-ethylamino-6-ethoxy-pyrimidine is obtained by reacting 2,4,6-trichloro-pyrimidine with one equivalent of aniline at 40–50°, condensing the mixture of 4-phenylamino-2,6-dichloro-pyrimidine and 2-phenylamino-4,6-dichloro-pyrimidine resulting therefrom with one equivalent of ethylamine at about 80–90° in dioxane/water (volume ratio 1:4) to form a mixture of 2-ethylamino-4-phenylamino-6-chloro-pyrimidine and 2-phenylamino-4-ethylamino-6-chloro-pyrimidine, and reacting this mixture with excess sodium ethylate at a temperature of 80–120°.

While the two isomeric dyestuffs of the above formulas can be separated by known chromatographic methods, such separation does not afford dyestuffs of better dyeing properties than the above-described mixed dyestuff and is, moreover, highly uneconomical. The mixed dyestuff is, therefore, used for all practical purposes.

The individual dyestuff isomers can also be produced by coupling, in the same manner as described above, the diazonium salt used herein with the desired individual pyrimidine coupling component which can be produced by the method described in Example 12, infra, using corresponding starting materials.

Dyestuffs having similar properties are obtained if the equivalent amount of any of the diazo components given in column 2 of the following Table I is coupled with the equivalent amount of any of the coupling components, or a mixture thereof, given in column 3 under the conditions described in the above example.

TABLE I

| Example No. | Diazo component | Coupling component | Shade on polyglycol terephthalate fibres |
|---|---|---|---|
| 2 | 1-amino-4-methylsulphonyl-benzene. | 20.2 g. 2-methylamino-4-(3'-methylphenyl-amino)-6-methoxypyrimidine. 4.2 g.-(3'-methylphenylamino)-4-methyl-amino-6-methoxy-pyrimidine. | Yellow. |
| 3 | 1-amino-4-nitro-benzene. | 21.6 g. 2-ethylamino-4-(2'-methoxyphenyl-amino)-6-ethoxypyrimidine. 7.2 g. 2-(2'-methoxyphenylamino)-4-ethyl-amino-6-ethoxypyrimidine. | Orange. |
| 4 | do | 22.4 g. 2-ethylamino-4-(2'-methoxy-5'-methylphenylamino)-6-ethoxy-pyrimidine. 7.5 g. 2-(2'-methoxy-5'-methylphenyl-amino)-4-ethylamino-6-ethoxy-pyrimidine. | Reddish orange. |
| 5 | 1-amino-2-nitro-4-phenoxy-benzene. | 23.1 g. 2-ethylamino-4-(4'-chlorophenyl-amino)-6-ethoxy-pyrimidine. 7.7 g. 2-(4'-chlorophenylamino)-4-ethyl-amino-6-ethoxy-pyrimidine. | Red. |
| 6 | 1-amino-2-nitro-4-methyl-benzene. | 2-cyclohexylamino-4-phenylamino-6-(4'-methylphenylthio)-pyrimidine. | Orange. |
| 7 | 1-amino-2-methoxy-4-nitro-benzene. | 2-benzylamino-4-phenylamino-6-ethoxy-pyrimidine. | Do. |
| 8 | 1-amino-2,6-dichloro-4-nitro-benzene. | 25.7 g. 2-(β-hydroxyethylamino)-4-phenyl-amino-6-butoxy-pyrimidine. 4.6 g. 2-phenylamino-4-(β-hydroxyethyl-amino)-6-butoxy-pyrimidine. | Do. |
| 9 | do | 4-cyclohexyloxyethoxy-2-ethylamino-6-phenylamino-pyrimidine. | Do. |
| 10 | 1-amino-2,4-dinitrobenzene. | 23.3 g. 2-ethoxy-4-phenylamino-6-(β-hydroxyethylamino)-pyrimidine. 4.2 g. 2-phenylamino-4-ethoxy-6-(β-hydroxyethylamino)-pyrimidine. | Reddish orange. |
| 11 | 1-amino-2,4-dinitro-6-bromo-benzene. | 28.0 g. 2-(β-acetoxyethylamino)-4-phenyl-amino-6-isopropoxy-pyrimidine. 5.0 g. of 2-phenylamino-4-(β-acetoxyethyl-amino)-6-isopropoxy-pyrimidine. | Yellowish scarlet. |

EXAMPLE 12

A fine suspension of 13.8 g. of 1-amino-4-nitrobenzene in 300 g. of water, 60 g. of 36% hydrochloric acid and 5 g. of cetylpolyglycol ether is diazotised in the usual way at 0–5° by the addition of 6.9 g. of sodium nitrite. The diazonium salt solution obtained is clarified and then, at 0–10°, is added dropwise to a solution of 32.8 g. of 2-n-propylamino-4-phenylamino-6 - phenoxy - pyrimidine in 500 g. of 80% acetic acid and 350 g. of water. The pH value of the coupling mixture is then increased to 4–4.5 by the addition of sodium acetate. On completion of the coupling, the dyestuff precipitate formed, the composition of which corresponds to the formula

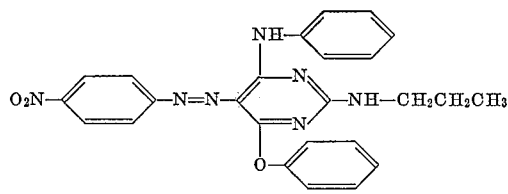

is isolated by suction filtration, washed with water and then dried in vacuo at 60–70°. The dyestuff obtained is a red coloured, amorphous powder.

A preparation produced by milling the dyestuff with a lignin sulphonate, dyes polyglycol terephthalate in aqueous dispersion, optionally in the presence of a carrier such as the sodium salt of o-phenyl-phenol, in pure orange shades. The dyeings have very good fastness to washing, perspiration, rubbing, light and sublimation.

The 2-n-propylamino-4-phenylamino-6-phenoxy-pyrimidine used in this example as coupling component is obtained by reacting 2,4,6-trichloro-pyrimidine with one equivalent of aniline to form a mixture of 4-phenylamino-2,6-dichloropyrimidine and 2 - phenylamino-4,6-dichloropyrimidine, isolating the 4-phenylamino-2,6-dichloropyrimidine by fractionated crystallisation of the isomer mixture from benzene, reacting the isolated 4-phenylamino - 2,6-dichloropyrimidine with one equivalent of n-propylamine at a temperature of about 80–100°, and condensing the resultant 2-n-propylamino-4-phenylamino-6-chloro-pyrimidine with sodium phenolate in excess phenol at a temperature of about 160–180°.

In an analogous manner, individual pyrimidine coupling components can be obtained in all those cases described in preceding and subsequent examples in which mixed coupling components have been employed. The separation is carried out in a known manner by fractional crystallisation using solvents of stronger polarity the stronger the polarity of the substitution of the pyrimidine isomers. Chromatography is employed in those cases in which fractional crystallisation would be impracticable and/or uneconomic.

EXAMPLE 13

16.3 g. of 1-amino-2-cyano-4-nitrobenzene are dissolved in 200 g. of concentrated sulphuric acid and, at 5–10°, the solution is diazotised with an amount of nitrosyl sulphuric acid corresponding to 6.9 g. of sodium nitrite. The diazonium salt solution obtained is added dropwise, at 5–12°, to a solution of 32.2 g. of 2-ethylamino-4-phenylamino-6-phenylthiopyrimidine in 250 g. of 80% acetic acid, 300 g. of methyl alcohol and 400 g. of water. On completion of the coupling, the red-orange coloured precipitate formed, the composition of which corresponds to the formula

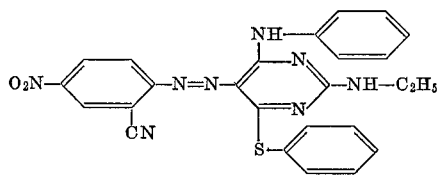

is separated by filtration, washed with water in the usual way and then dried at 60–70°.

5 g. of the dyestuff obtained is brought into a finely dispersible form by milling with 15 g. of a lignin sulphonate.

Clear, reddish orange coloured dyeings on polyglycol terephthalate fibres are obtained with this dye preparation in aqueous dispersion, optionally in the presence of a carrier such as the sodium salt of o-phenyl-phenol. The dyeings have very good fastness to washing, perspiration, rubbing, light and sublimation.

The 2 - ethylamino-4-phenylamino-6-phenylthio-pyrimidine used in this example as coupling component is obtained, e.g. by condensing 4-phenylamino-2,6-dichloro-pyrimidine with one equivalent of ethylamine at a temperature of about 80–100° and reacting the resultant 2-ethylamino-4-phenylamino-6-chloro-pyrimidine with one equivalent of sodium thiophenolate in thiophenol at a temperature of about 140–170°.

EXAMPLE 14

A fine suspension of 17.3 g. of 1-amino-2-nitro-4-chlorobenzene in 300 g. of water, 60 g. of 36% hydrochloric acid and 5 g. of cetyl-polyglycol ether is diazotised in the usual way at 0–10° by the addition of 6.9 g. of sodium nitrite. The diazonium salt solution obtained is clarified and then added dropwise to a solution of a mixture of 22.8 g. of 2-ethylamino-4-(2'-methoxy-phenylamino)-6-(β-hydroxy-ethoxy)-pyrimidine and 7.6 g. of 2-(2'-methoxy-phenylamino)-4-ethylamino-6-(β-hydroxyethoxy)-pyrimidine in 200 g. of ethylene glycol monoethyl ether, 100 g. of 36% hydrochloric acid and 350 g. of water. The pH value of the coupling bath is then adjusted to 4–4.5 by the addition of sodium acetate. On completion of the coupling, the orange coloured precipitate, the composition of which corresponds to the formulae

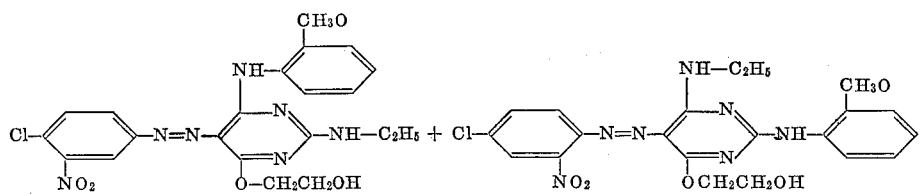

is separated by filtration, washed with a large amount of water and then dried at 60–70°. 10 g. of the dyestuff so amino) - 6 - (β-hydroxy - ethoxy)-pyrimidine and 2 - (2'-Polyglycol terephthalate fibres can be dyed with this dye preparation from aqueous dispersion, optionally in the presence of a carrier such as trichlorobenzene, in pure orange shades. The dyeings have very good fastness to washing, perspiration, decatising, light and sublimation.

The mixture used in this example as coupling component, consisting of 2-ethylamino - 4 - (2'-methoxyphenyl-amino)-6-(β-hydroxy - ethoxy)-pyrimidine and 2 - (2'-methoxyphenylamino)-4-ethylamino - 6 - (β - hydroxyethoxy)-pyrimidine, is obtained, e.g. by reacting 2,4,6-trichloro-pyrimidine with one equivalent of 1-amino-2-methoxybenzene to form a mixture of 4-(2'-methoxyphenylamino)-2,6-dichloro-pyrimidine and 2-(2'-methoxyphenylamino)-4,6-dichloro-pyrimidine, condensing this mixture at 80–90° with one equivalent of ethylamine to form a mixture of 2 - ethylamino-4-(2'-methoxyphenylamino) - 6 - chloro-pyrimidine and 2-(2'-methoxyphenyl-amino)-4-ethylamino - 6 - chloro-pyrimidine, and then condensing this mixture with the monosodium salt of ethylene glycol. The last step of the sequence of reaction is performed preferably in excess ethylene glycol at a temperature of 80–120°.

Dyestuffs having similar good properties are obtained when the equivalent amount of any of the diazo components given in column 2 of the following Table II is coupled under the conditions described in the above example with any coupling component or mixture thereof given in column 3.

TABLE II

| Example No. | Diazo component | Coupling component | Shade on polyglycol terephthalate fibres |
|---|---|---|---|
| 15 | 1-aminobenzene-4-carboxylic acid ethyl ester. | 24.5 g. 2-ethylamino-4-phenylamino-6-(β-methoxy-ethoxy)-pyrimidine. 4.3 g. 2-phenylamino-4-ethyl-amino-6-(β-methoxy-ethoxy)-pyrimidine. | Greenish yellow. |
| 16 | 1-amino-4-nitrobenzene. | 28.0 g. 2-n-propylamino-4-phenylamino-6-(β-acetoxy-ethoxy)-pyrimidine. 5.0 g. 2-phenylamino-4-n-propylamino-6-(β-acetoxy-ethoxy)-pyrimidine. | Orange. |
| 17 | do | 25.6 g. 2-ethalymino-4-phenylamino-6-butylthio-pyrimidine. 4.6 g. 2-phenylamino-4-ethyl-amino-6-butylthio-pyrimidine. | Reddish orange. |
| 18 | 1-amino-2-bromo-4-nitro-benzene. | 29.7 g. 2-ethylamino-4-phenylamino-6-(β-phenoxy-ethoxy)-pyrimidine. 5.3 g. 2-phenylamino-4-ethyl-amino-6-(β-phenoxy-ethoxy)-pyrimidine. | Orange. |
| 19 | 1-amino-4-nitrobenzene. | 27.2 g. 2-ethylamino-4-phenylamino-6-benzyloxy-pyrimidine. 4.8 g. 2-phenylamino-4-ethylamino-6-benzyloxy-pyrimidine. | Do. |
| 20 | do | 22.3 g. 2-ethylamino-4-phenylamino-6-ethoxy-pyrimidine. 3.3 g. 2-phenylamino-4-ethylamino-6-ethoxy-pyrimidine. | Do. |
| 21 | 1-amino-2-nitro-4-ethyl-sulphonyl benzene. | 22.3 g. 2-ethylamino-4-phenylamino-6-ethoxy-pyrimidine. 3.3 g. 2-phenylamino-4-ethylamino-6-ethoxy-pyrimidine. | Do. |
| 22 | 1-amino-2,4-di-nitro-6-chlorobenzene. | 25.0 g. 2-ethanylmio-4-phenyl-amino-6-(β-hydroxy-ethoxy)-pyrimidine. 4.4 g. 2-phenylamino-4-ethylamino-6-(β-hydroxy-ethoxy)-pyrimidine. | Scarlet. |
| 23 | do | 23.1 g. 2-ethylamino-4-phenylamino-6-propoxy-pyrimidine. 4.1 g. 2-phenylamino-4-ethylamino-6-propoxy-pyrimidine. | Yellowish scarlet. |
| 24 | 1-amino-4-nitrobenzene. | 23.1 g. 2-ethylamino-4-phenylamino-6-propoxy-pyrimidine. 4.1 g. 2-phenylamino-4-ethylamino-6-propoxy-pyrimidine. | Orange. |
| 25 | 1-amino-2,4-di-nitro-6-chlorobenzene. | 24.3 g. 2-ethylamino-4-phenylamino-6-butoxy-pyrimidine. 4.3 g. 2-phenylamino-4-ethylamino-6-butoxy-pyrimidine. | Yellowish scarlet. |
| 26 | 1-amino-4-nitrobenzene. | do | Orange. |
| 27 | 1-amino-2,6-di-chloro-4-nitrobenzene. | 24.5 g. 2-ethylamino-4-(2'-methoxyphenyl-amino)-6-ethoxy-pyrimidine. 4.3 g. 2-(2'-methoxyphenylamino)-4-ethylamino-6-ethoxy-pyrimidine. | Do. |
| 28 | 1-amino-2,4-di-nitro-6-chlorobenzene. | 25.6 g. 2-ethylamino-4-(2'-methoxy-5'-methylphenylamino)-6-ethoxy-pyrimidine. 4.6 g. 2-(2'-methoxy-5'-methyl-phenyl-amino)-4-ethylamino-6-ethoxy-pyrimidine. | Red-brown. |
| 29 | 1-amino-4-nitrobenzene. | 2-ethylamino-4-phenylamino-6-cyclohexyloxy-pyrimidine. | Orange. |
| 30 | do | 2-phenylamino-4-ethylamino-6-benzyloxy-pyrimidine. | Do. |
| 31 | do | 2-ethylamino-4-phenylamino-6-(β-hydroxy-ethylthio)-pyrimidine. | Do. |
| 32 | 1-amino-2-cyano-4-nitro-benzene. | 24.5 g. 2-(β-hydroxy-ethoxy)-4-phenyl-amino-6-isopropylamino-pyrimidine. 4.3 g. 2-phenylamino-4-(β-hydroxy-ethoxy)-6-isopropylamino-pyrimidine. | Do. |
| 33 | 1-amino-2,6-dibromo-4-nitrobenzene. | 24.5 g. 2-(γ-methoxy-propylamino)-4-phenylamino-6-(β-methoxy-ethoxy)-pyrimidine. 4.3 g. 2-phenylamino-5-(γ-methoxy-propylamino)-6-(β-)methoxy-ethoxy)-pyrimidine. | Orange. |
| 34 | 1-amino-3-trifluoro-methyl-4-nitrobenzene. | 2-ethylamino-4-phenyl-amino-6-(β-methoxy-carbonyloxy-ethoxy)-pyrimidine. | Yellowish orange. |
| 35 | 1-amino-2-nitro-4-phenoxy-benzene. | 2-propylamino-4-phenyl-amino-6-(β-benzyloxy-ethoxy)-pyrimidine. | Scarlet. |
| 36 | Phenyl-1-amino-2-nitro-benzene-4-sulfonate. | 2-amino-4-phenylamino-6-cyclohexylthio-pyrimidine. | Orange. |
| 37 | 4'-methylphenyl-1-amino-2-nitro-benzene-4-sulfonate. | 2-ethylamino-4-(2'-methyl-phenylamino)-6-benzyl-thiopyrimidine. | Do. |
| 38 | Ethyl-1-amino-4-nitro-benzene-2-carboxylate. | 2-ethylamino-4-phenyl-amino-6-β-methoxy-ethyl-thio-pyrimidine. | Do. |
| 39 | β-Hydroxy-ethyl-1-amino-2-nitro-benzene-4-carboxylate. | 2-ethylamino-4-phenyl-amino-6-β-phenoxy-ethyl-thio-pyrimidine. | Do. |
| 40 | β-Methoxy-ethyl-1-amino-2-nitro-benzene-4-carboxylate. | 2-phenylamino-4-β-phenoxy-ethylamino-6-ethoxy-pyrimidine. | Do. |
| 41 | 1-amino-2-nitro-benzene-4-sulfonic acid ethylamide. | 2-ethylamino-4(4'-cyano-phenylamino)-6-ethoxy-pyrimidine. | Do. |
| 42 | 1-amino-2-nitrobenzene-4-sulfamoyl-benzene. | 2-β-acetoxyethylamino-4-phenylamino-6-(β-acetoxy-ethoxy)-pyrimidine. | Do. |
| 43 | 1-amino-2-nitrobenzene-4-sulfonic acid. N-(β-hydroxy-ethyl)-amide. | 2 amino-4-phenylamino-6-cyclohexyloxy-pyrimidine. | Do. |

TABLE II.—Continued

| Example No. | Diazo component | Coupling component | Shade on polyglycol terephthalate fibres |
|---|---|---|---|
| 44 | 1-amino-2-nitro-benzene-4-sulfonic acid. N-(γ-methoxypropyl)-amide. | 2-ethylamino-4-phenyl-amino-6-(2'-methyl-phenoxy)-pyrimidine. | Orange. |
| 45 | 1-amino-2-nitro-benzene-4-sulfonic acid cyclohexylamide. | 2-methylamino-4-phenyl-amino-6-(4'-methoxy-phenoxy)-pyrimidine. | Do. |
| 46 | 1-amino-2-nitro-benzene-4-sulfonic acid phenylamide. | 2-(4'-chlorophenoxy)-4-phenylamino-6-ethyl-amino-pyrimidine. | Do. |
| 47 | 1-amino-2-nitro-benzene-4-sulfonic acid benzylamide. | 2-(4'-bromophenoxy)-4-phenylamino-6-methyl-amino-pyrimidine. | Do. |
| 48 | 1-amino-4-nitro-benzene-2-sulfonic acid N,N-dimethyl-amide. | 2-ethylamino-4-phenyl-amino-6-(β-benzoyloxy-ethoxy)-pyrimidine. | Do. |
| 49 | 1-amino-2-nitro-benzene-4-sulfonic acid N-(β-sulfonic acid N-(τ-hydroxy-ethyl)-N-phenyl-amide. | 2-ethoxy-4-phenyl-amino-6-(β-benzyloxy-ethylamino)-pyrimidine-ethylamino)-pyrimidine. | Do. |
| 50 | 1-amino-2-nitro-benzene-4-carboxylic acid amide. | 2-(γ-benzoyloxy-propyl-amino)-4-phenylamino-6-ethoxy-pyrimidine. | Do. |
| 51 | 1-amino-2-nitro-benzene-4-carboxylic acid methylamide. | 2-(γ-methoxycarbonyloxy-propylamino)-4-phenyl-amino-6-propoxy-pyrimidine. | Do. |
| 52 | 1-amino-2-nitro-benzene-4-carboxylic acid N-(τ-hydroxy-ethyl)-amide. | 2-ethylamino-4-phenyl-amino-6-(δ-hydroxy-butoxy)-pyrimidine. | Do. |
| 53 | 1-amino-2-nitro-benzene-4-carboxylic acid N-(G-methoxy-propyl)-amide. | 2-ethylamino-4-phenyl-amino-6-(τ-hydroxy-ethoxy)-pyrimidine. | Do. |
| 54 | 1-amino-2-nitro-benzene-4-carboxylic acid cyclohexylamide. | ....do.......................... | Do. |
| 55 | 1-amino-2-nitro-benzene-4-carboxylic acid phenylamide. | ....do.......................... | Do. |
| 56 | 1-amino-2-nitrobenzene-4-carboxylic acid benzyl-amide. | 2-ethylamino-4-phenylamino-6-(β-methoxyethoxy)pyrimidine. | Do. |
| 57 | 1-amino-4-nitrobenzene-2-carboxylic acid dimethyl-amide. | ....do.......................... | Do. |
| 58 | 1-amino-4-nitrobenzene-2-caroxylic acid N-methyl-N-(β-hydroxy-ethyl)-amide. | ....do.......................... | Do. |
| 59 | 1-amino-4-nitro-2,6-dibromo-benzene. | 2-ethylamino-4-(4'-methoxyphenyl-amino)-6-(β-hydroxy-ethyloxy)-pryimidine. | Scarlet. |
| 60 | 1-amino-2-chloro-4-nitro-benzene. | 25 g. 2-ethylamino-4-phenylamino-6-(β-hydroxyethoxy)-pyrimidine. 4.4 g. 2-phenylamino-4-ethylamino-6-(β-hydroxyethoxy)-primidine. | Orange. |
| 61 | 1-amino-2,6-dichloro-4-nitro-benzene. | ....do.......................... | Do. |
| 62 | 1-amino-2-chloro-4-nitro-benzene. | 25 g. 2-ethylamino-4-phenylamino-6-(β-ethoxy-ethyoxy-primidine. 7.2 g. 2-phenylamino-4-ethylamino-6-(β-ethoxy-ethoxy)-pyrimidine. | Do. |
| 63 | ....do.......................... | 22.8 g. 2-ethylamino-4-(4'-methoxyphenyl-amino)-6-(β-hydroxyethoxy)-pyrimidine. 7.6 g. 2-(4'-methoxy-phenyl-amino)-4-ethylamino-6-(β-hydroxy-ethoxy-pyrimidine. | Scarlet. |
| 64 | 1-amino-2-chloro-4-nitro-benzene. | 7.6 g. 2-ethylamino-4-(4'-methoxyphenyl-amino)-6-(β-hydroxy-ethoxy)-pyrimidine. 22.8 g. 2-(4'-methoxy-phenylamino)-4-ethyl-amino-6-(β-hydroxy-ethoxy)-pyrimidine. | Scarlet. |
| 65 | 1-amino-4-nitro-benzene. | 2-ethylamino-4-(2'-methoxyphenylamino)-6-(β-ethoxy-ethoxy)-pyrimidine. | Orange. |
| 65a | 1-amino-2-nitro-4-methyl-suflonyl-benzene. | 18 g. 2-(β-acetoxy-ethylamino)-4-(2'-methyl-phenylamino)-6-(β-acetoxy-ethoxy)-pyrimidine. 20 g. 2-(2'-methylphenyl-amino)-4-(p-acetoxy-ethylamino-6-(β-acetoxy-ethoxy)-pyrimidine. | Do. Do. |
| 65b | 1-amino-4-nitro-benzene. | 23 g. 2-β-hydrosy-ethylamino-4-phenyl-amino-6-β-hydroxyethoxy-pyrimidine. 7 g. 4-β-hydroxy-ethylamino-2-phenyl-amino-6-β-hydroxyethoxy-pyrimidine. | Do. |
| 65c | ....do.......................... | 25 g. 2-γ-methoxypropylamino-4-phenyl-amino-6-β-methoxy-ethoxy-pyrimidine. 9.5 g. 4-γ-methoxypropylamino-2-phenyl-amino-6-β-methoxyethoxy-pyrimidine. | Do. |

EXAMPLE 66

40 g. of the dyestuff produced as described in Example 14 are added with stirring to 200 g. of glacial acetic acid, 2 g. of acetic anhydride are added to the resulting suspension and the whole is heated for 4 hours at 85–95°. The reaction mixture is then left to cool to 40–50°, whereupon 100 g. of methanol are added dropwise thereto. A red-orange coloured dyestuff precipitates which is a mixture of the two isomers falling under the formula

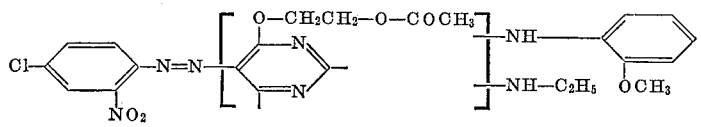

This mixed dyestuff is separated from the reaction liquor by filtration, washed and dried. It is brought into a finely dispersible form by milling with 2 g. of lignin sulfonate per gram of dyestuff.

Polyethylene glycol terephthalate (e.g. Dacron) fibres can be dyed in orange shades with the resulting dyestuff, preferably with the aid of a swelling agent such as trichlorobenzene. The dyeing is very fast to washing, rubbing, light and sublimation.

EXAMPLE 67

Polygylcol terephthalate fabric (e.g. Dacron) is impregnated at 40° in a padding mangle with a liquor of the following composition:

45 parts by weight of the dyestuff mixture obtained according to example 22, finely dispersed in
7.5 parts by weight of sodium alginate,
20 parts by weight of triethanolamine,
20 parts by weight of octylphenol polyglycol ether and
900 parts of water.

The fabric which has been squeezed out to a content of about 100% impregnation liquor is dried at 100° and then fixed for 30 seconds at a temperature of 210°. The dyed goods are rinsed with water, soaped and dried. Under these conditions, a scarlet dyeing is obtained which is fast to washing, perspiration, rubbing, light and sublimation.

The dyestuffs described in the other examples yield dyeings of equal quality by this process.

EXAMPLE 68

In an apparatus for dyeing under pressure, 4 g. of the dyestuff obtained according to example 60 are finely suspended in 2000 g. of water which contains 6 g. of oleyl polyglycol ether. The pH of the dyebath is adjusted to 5–5.5 with acetic acid.

100 g. of polyglycol terephthalate fabric are then introduced at 50°, the bath is heated within 30 minutes to 140° and dyeing is performed for 50 minutes at this temperature. The dyeing is then rinsed with water, soaped and dried. Under these conditions a pure orange dyeing is obtained which is fast to perspiration, light and sublimation.

The dyestuffs described in the other examples yield dyeings of equal quality by this process.

EXAMPLE 69

2 g. of the mixture of dyestuffs obtained according to Example 65 are dispersed in 4000 g. of water. 12 g. of sodium-o-phenyl phenolate are added to this dispersion as carrier and also 12 g. of diammonium phosphate are added, and 100 g. of polyglycol terephthalate yarn are dyed for 1½ hours at 95–98°. The dyeing is rinsed and aftertreated with dilute sodium hydroxide solution and a dispersing agent.

In this way a pure orange dyeing is obtained which is fast to washing, perspiration and light.

If in the above example, the 100 g. of polyglycol terephthalate yarn are replaced by 100 g. of cellulose triacetate fabric, dyeing is performed under the conditions given and the dyeing is then rinsed with water, an orange dyeing is obtained which has very good fastness to washing and sublimation.

EXAMPLE 70

(a) 93 g. of aniline are suspended in a mixture of 400 g. of water and 200 ml. of acetone, and 8 g. of anhydrous sodium acetate are added dropwise thereto. 183.4 g. of 2,4,6-trichloropyrimidine dissolved in 200 ml. of acetone are then added dropwise and, while maintaining the reaction mixture at a temperature of 50–55°, 40 g. of sodium hydroxide dissolved in 160 g. of water are added at such a rate that the pH of the reaction mixture remains between 5 and 6 throughout the addition of the trichloropyrimidine. Stirring is then continued at the same temperature range for 4 hours, whereupon the acetonic phase formed is separated from the supernatant aqueous phase, and the acetonic phase is then evaporated to dryness.

The residue consists of a mixture of 85% by weight of 4 - phenylamino - 2,6 - dichloro-pyrimidine and 15% by weight of 2-phenylamino-4,6-dichloro-pyrimidine; it is then dissolved in 500 ml. of 80° warm benzene, and, upon cooling, 56.4 g. of the 4-phenyl-amino isomer crystallize (M.P. 135–136°).

The mother liquor is then evaporated to dryness and redissolved in 280 ml. of benzene having a temperature of 80°. Upon cooling, another 101 g. of 4-phenylamino-2,6-dichloro-pyrimidine (M.P. 135–136°) crystallize. The final mother liquor, separated from the crystals, can then be used for isolating the 2-phenylamino isomer therefrom. The second batch of crystals of the 4-phenylamino isomer obtained is still sufficiently pure to be used together with the first batch in the production of azo dyestuff coupling components therefrom on an industrial scale.

(b) 48 g. of 4-phenylamino-2,6-dichloro-pyrimidine obtained from step (a) are dissolved into 100 g. of dioxan, and 160 g. of water are added to the solution; to the resulting suspension there are added 30 g. of ethylamine in 30 g. of water, the reaction mixture is then heated to 85–90° during 6 hours with stirring, and stirring is continued while the mixture cools down to room temperature. Technically pure 4-phenylamino-2-ethylamino-6-chloropyrimidine having a melting point of about 90° precipitates and is separated by filtration and dried.

(c) 50 g. of the latter product are mixed with an excess, above the stoichiometrically required amount, of sodium ethylate, dissolved in ethanol, and the mixture is heated with stirring at 110–120° for 2 hours. 4-phenylamino-2-ethylamino-6-ethoxy-pyrimidine of syrupy consistency is obtained which can be used directly as coupling component in Examples 1 to 66, in lieu of the coupling component used therein in the production of dyestuffs of similar properties.

EXAMPLE 71

(a) The second mother liquor obtained as described under (a) in Example 70 is evaporated to dryness and a residue of 43.1 g. of crude 2-phenylamino-4,6-dichloro-pyrimidine (M.P. 90–91°) is obtained.

5 g. of this crude product are dissolved in 20 ml. of benzene and chromatographed on a 20 cm. x 5 cm. alumina column. The pure 2-phenylamino-4,6-dichloro-pyrimidine is eluted with benzene/chloroform (volume ratio 1:1. It has a melting point of 111–112°.

(b) Step (b) of Example 70 is then repeated, but using 48 g. of 2-phenylamino-4,6-dichloro - pyrimidine as starting material, and, since the desired product does not precipitate, it is necessary to subject the reaction mixture to steam distillation. An orange-coloured resin is obtained which is dissolved in four times its amount (about 120 ml.) of ethanol at 80°. Upon cooling, 30 g. of purified 2-phenylamino - 4 - ethylamino-6-chloropyrimidine crystallises. It is separated by filtration and dried, and has a melting point of 103–104°.

(c) Step (c) of Example 70 is repeated with this intermediate and a yellowish syrupy product consisting of 2-phenylamino - 4 - ethylamino-6-ethoxy-pyrimidine is obtained which can be used directly as coupling component in each of the preceding Examples 1–66, in lieu of the coupling components used in the latter, and dyestuffs of similar properties as those of the preceding dyestuffs are thereby obtained.

By repeating Examples 70 and 71, respectively, but using in lieu of sodium ethylate in step (c) of these examples an equivalent amount of sodium phenolate and sodium thiophenolate, respectively, and employing a temperature range of about 140–170° instead of 110–120°, there are obtained the following pyrimidine coupling components:

4-phenylamino-2-ethylamino-6-phenoxy-pyrimidine,
2-phenylamino-4-ethylamino-6-phenoxy-pyrimidine,
4-phenylamino-2-ethylamino-6-phenylthio-pyrimidine and
2-phenylamino-4-ethylamino-6-phenylthio-pyrimidine, which can be used as coupling components in Examples 1 to 66 in lieu of the coupling components used therein, whereby dyestuffs of similar properties as those described in these examples are obtained.

EXAMPLE 72

Step (a) of Example 70 is repeated, but in lieu of 93 g. of aniline, there are used 61 g. of 2-amino-ethanol; from the resulting mixture of the two isomers, the 2-(β-hydroxyethylamino) - 4,6 - dichloro-pyrimidine is isolated, and steps (b) and (c) of Example 71 are then repeated, but using aniline in lieu of ethylamine in step (b).

2 - (β - hydroxyethylamino)-4-phenylamino-6-ethoxy-pyrimidine is obtained which can be used as coupling component in the preceding Examples 1 to 66 in lieu of the coupling components used therein.

For instance, by repeating the procedure of Example 12, but using therein as diazo component the diazonium compound from 1-amino-2,4 - dinitro - 6 - chloro-benzene and as coupling component the above-described pyrimidine, there is obtained the dyestuff of the formula

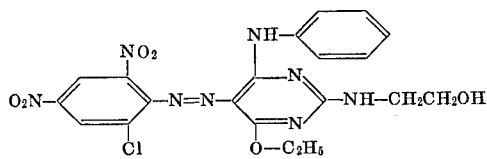

which dyes polyethylene glycol terephthalate fibers in pure scarlet shades of good all round fastness properties.

We claim:
1. A dyestuff of the formula

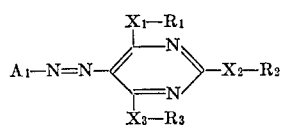

wherein
$A_1$ represents a phenyl radical substituted as follows:
(a) by, as first substituent, a nitro group;
(b) by a second substituent selected from hydrogen, nitro, cyano, chlorine, bromine, lower alkyl, lower alkoxy, phenoxy, trifluoromethyl, lower alkylsulfonyl, phenoxysulfonyl, lower alkylphenoxysulfonyl, lower alkoxycarbonyl, hydroxy-lower alkoxycarbonyl, lower alkoxy-lower alkoxy carbonyl and a substituent of the formula

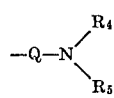

wherein Q represents —$SO_2$— or —CO—;
$R_4$ represents hydrogen, lower alkyl, hydroxy-lower alkyl, lower alkoxy-lower alkyl, phenyl, benzyl or cyclohexyl; and
$R_5$ represents hydrogen, lower alkyl or hydroxy-lower alkyl; and (c) by a third substituent selected from hydrogen, chlorine or bromine;
one of the groupings —$X_1$—$R_1$ and —$X_2$—$R_2$ is phenylamino radical any substituent of which is selected from hydrogen, lower alkyl, lower alkoxy, chlorine, bromine and cyano,
one of the substituent pair consisting of the remaining substituent —X—R and the substituent —$X_3$—$R_3$ represents
lower alkoxy; cyclohexyloxy; benzyloxy; a phenyloxy radical any substituent of which is selected from hydrogen, lower alkyl, lower alkoxy, chlorine and bromine; lower alkanoyloxy-lower alkoxy, hydroxy-lower alkoxy, lower alkoxy-lower alkoxy, phenoxy-lower alkoxy, benzyloxy-lower alkoxy, benzoyloxy-lower alkoxy, lower alkoxy-carbonyloxy-lower alkoxy, lower alkylthio, cyclohexylthio, benzylthio, hydroxy-lower alkylthio, phenylthio, lower alkyl-phenylthio, lower alkoxy-lower alkylthio, phenoxy-lower alkylthio or cyclohexyloxy-lower alkoxy;
and the third substituent —X—R represents amino, lower alkylamino, cyclohexylamino, benzylamino, lower alkanoyloxy-lower alkylamino, hydroxy-lower alkylamino, lower alkoxy-lower alkylamino, phenoxy-lower alkylamino, benzyloxy-lower alkylamino, benzoyloxy-lower alkylamino or lower alkoxycarbonyloxy-lower alkylamino.

2. A dyestuff as defined in claim 1, wherein said nitro group as first substituent of $A_1$ is in o- or p-position relative to the azo bridge at the said phenyl radical.

3. A dyestuff being a mixture of the two isomers defined by the formula

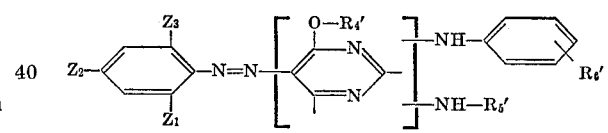

wherein one of $Z_1$, $Z_2$ and $Z_3$ is nitro,
a second one thereof is hydrogen, nitro, cyano, lower alkyl-sulfonyl, chlorine or bromine, and the third Z is hydrogen, chlorine or bromine; and
One of $R_4'$ and $R_5'$ is hydroxy-lower alkyl, lower alkoxy-lower alkyl or lower alkanolyoxy-lower alkyl, and the other is lower alkyl, hydroxy-lower alkyl, lower alkoxy-lower alkyl or lower alkanoyloxy-lower alkyl, and
$R_6'$ is hydrogen, methyl or methoxy.

4. A dyestuff as defined in claim 3, which consists of a mixture of the two isomers defined by the formula

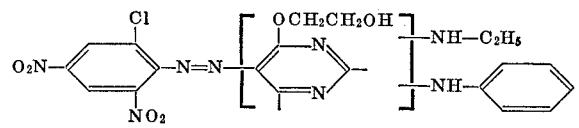

5. A dyestuff as defined in claim 3, which consists of a mixture of the two isomers defined by the formula

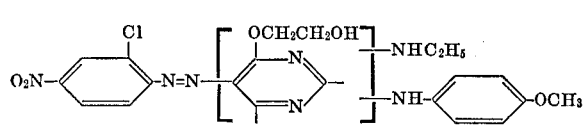

6. A dyestuff as defined in claim 3, which consists of a mixture of the two isomers defined by the formula

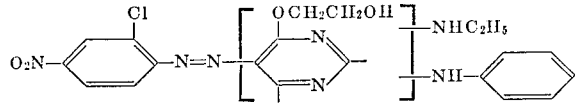

7. A dyestuff as defined in claim 3, which consists of a mixture of the two isomers defined by the formula

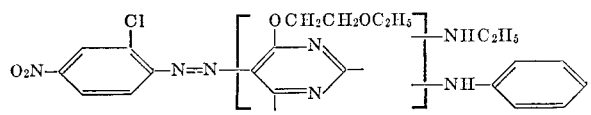

8. A dyestuff as defined in claim 1, which consists of a dyestuff of the formula

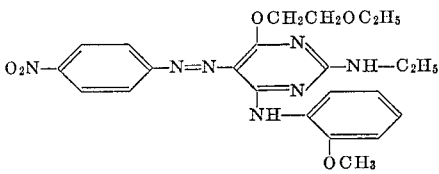

References Cited

UNITED STATES PATENTS 3,042,648  7/1962  Lewis _____ 260—154 X

CHARLES B. PARKER, Primary Examiner

D. M. PAPUGA, Assistant Examiner

U.S. Cl. X.R.

8—26, 41, 50, 54, 54.2, 55; 106—22, 228; 260—256.4, 256.5